United States Patent [19]

Follmeyer

[11] 4,286,778

[45] Sep. 1, 1981

[54] MACHINING FIXTURES

[76] Inventor: Fred R. Follmeyer, 6556 Maplewood Dr., Suite 202, Mayfield Heights, Ohio 44124

[21] Appl. No.: 92,095

[22] Filed: Nov. 7, 1979

[51] Int. Cl.³ ............................................. B23Q 3/02
[52] U.S. Cl. .................................... 269/91; 269/303; 269/900; 409/225
[58] Field of Search ..................... 269/321 A, 99–100, 269/303–309, 91, 900; 409/225, 226, 220, 221, 222; 33/174 TA, 174 TB, 174 TC, 174 TD

[56] References Cited

U.S. PATENT DOCUMENTS

| | | | |
|---|---|---|---|
| 2,360,175 | 10/1944 | Tiede | 409/225 X |
| 3,848,495 | 11/1974 | Yourd | 269/305 X |
| 4,157,819 | 6/1979 | Meyer | 269/303 |

Primary Examiner—Robert C. Watson
Attorney, Agent, or Firm—Michael Williams

[57] ABSTRACT

A fixture attachable to the table of a machine for holding a part to be machined in operative relationship with the tool of the machine. The fixture comprises a base plate having a locator pin extending from its bottom surface and adapted to fit within an aperture in the machine table to locate the fixture on the table. A plurality of sector-shaped support pads are secured to the top surface of the base plate in evenly-spaced radial relation, adjoining margins of the pads being spaced to leave therebetween radially-extending portions of the top surface of the base plate. Locator blocks are adjustable to various positions radially of said top surface portions, each block having a locating pin, the pins cooperating to engage either the inside or outside peripheral surface of a circular part or workpiece to locate the same. Clamps are securable at various radial positions on the support pads to clamp the workpiece and hold it against axial separation from the fixture base.

7 Claims, 10 Drawing Figures

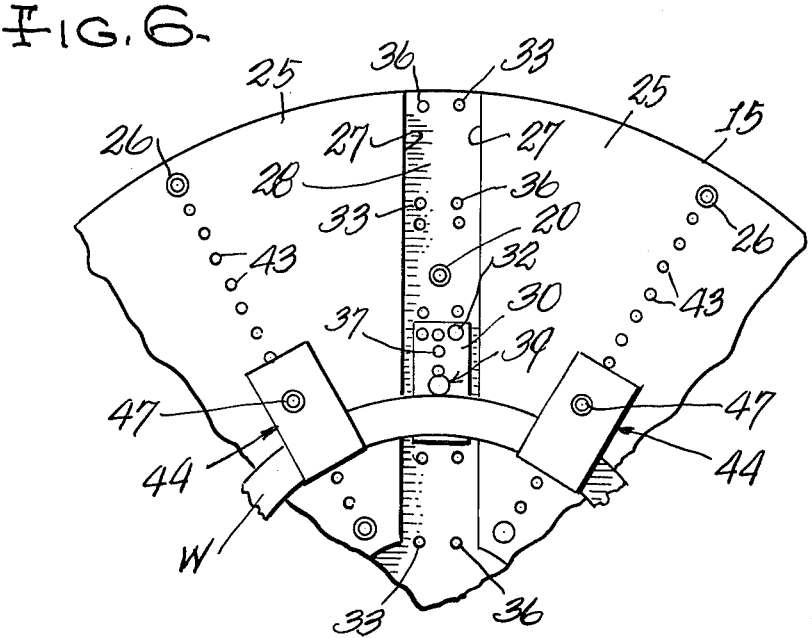
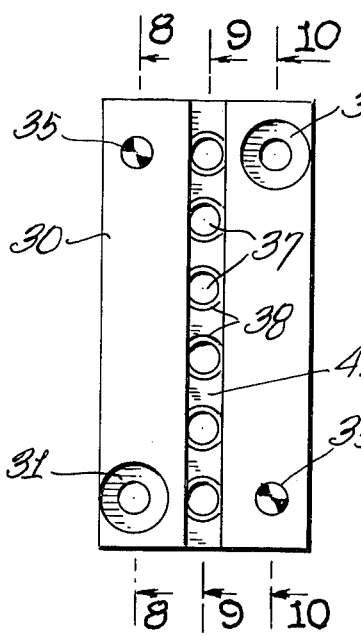
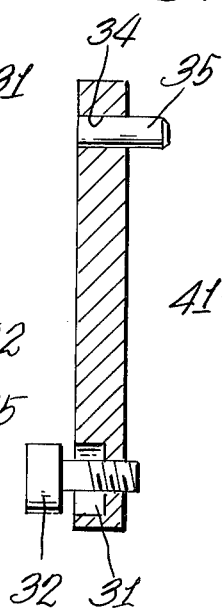
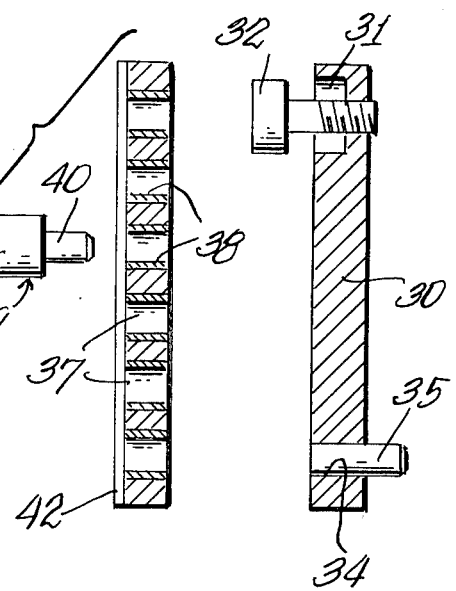

MACHINING FIXTURES

BACKGROUND AND SUMMARY

Heretofore machine fixtures included base plates designed specifically for the diameter of an individual workpiece, with very little adjustment provided to accomodate workpieces of larger or smaller diameters.

My improved fixture comprises a base plate having a flat lower surface adapted to rest upon the table of a machine, this surface having a locating pin extending therefrom to fit a hole in the machine table to locate the fixture with respect to the tool of the machine. The fixture is preferably used to hold workpieces for secondary machining operations, such as milling, drilling, cutting or grinding.

Support pads are secured to the top surface of the base plate and locator blocks are adjustable radially between the support pads. The locator blocks carry locator pins which form a circular pattern of abutments to engage either an inside or an outside peripheral surface of the workpiece to locate the same radially of the base plate. Clamps are carried by the support pads and engage the workpiece to locate it axially of the base plate.

DESCRIPTIONS OF THE DRAWINGS

In the drawings accompanying this specification and forming a part of this application, there is shown, for purpose of illustration, an embodiment which my invention may assume, and in these drawings:

FIG. 1 is a plan view of a presently-preferred embodiment of my invention showing the position of parts wherein a ringlike workpiece is located from its inner peripheral surface, a part of the workpiece being broken away and only one workpiece holding clamp shown, FIG. 2 is a side elevational view of the embodiment shown in FIG. 1 showing the base plate spaced upwardly from the machine table, FIG. 3 is a perspective view of the embodiment with the workpiece to be machined, and the clamps therefor, omitted, FIG. 4 is an enlarged, fragmentary sectional view corresponding to the line 4—4 of FIG. 1, FIG. 5 is an enlarged, fragmentary sectional view corresponding to the line 5—5 of FIG. 1, FIG. 6 is a fragmentary plan view showing the position of parts wherein a smaller ringlike workpiece is located from its outer peripheral surface, FIG. 7 is an enlarged plan view of a locator block, and FIGS. 8, 9 and 10 are sectional views corresponding the lines 8—8, 9—9 and 10—10 of FIG. 7.

DESCRIPTION OF THE PREFERRED EMBODIMENT

Figure 1:
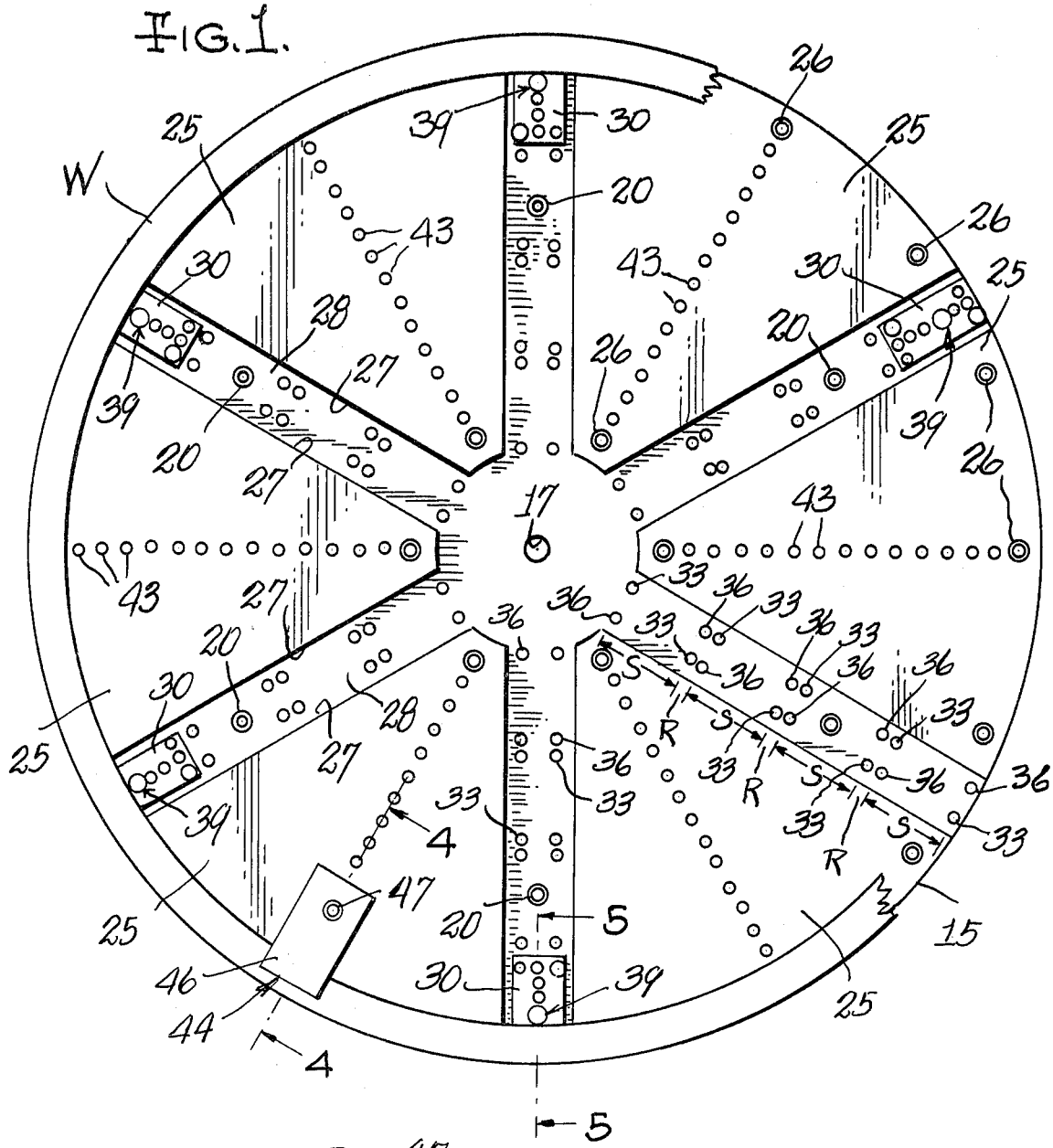
Figure 2:
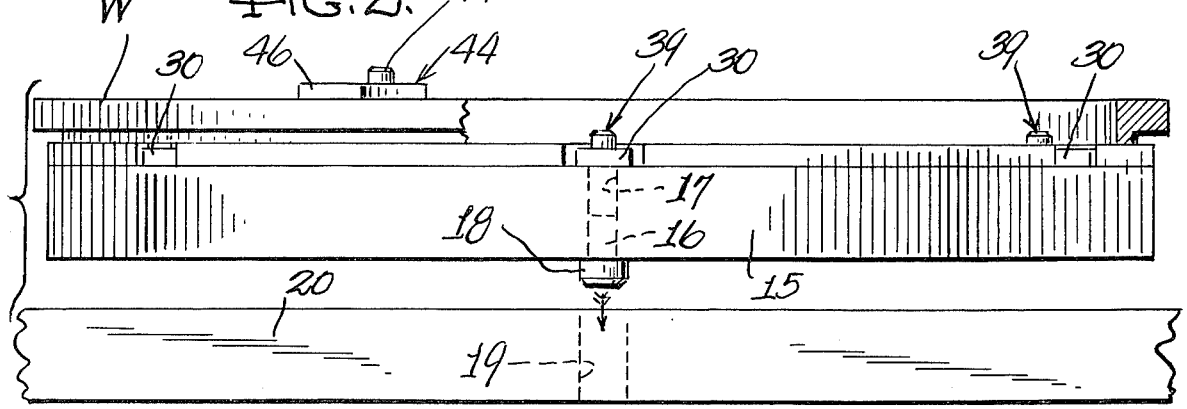

The base plate 15 comprises a sturdy support for the other parts of my improved fixture and is preferably circular, as seen in plan in FIG. 1, although it may be square, hexagonal, octagonal and the like. A locator pin 16 is fixed within a center hole 17 of the base plate, the pin having a head 18 extending from the undersurface of the plate and adapted to closely seat within an opening 19 in the upper surface of the machine table 20. The undersurface of the base plate is flat and when it is seated on the upper flat surface of the machine table, the head 18 seats within the opening 19 to locate the fixture, and the workpiece carried thereby, relative to the tool of the machine. Flat head socket cap screws 20 (six used in the disclosed embodiment) hold the base plate to the machine table.

Figure 3:
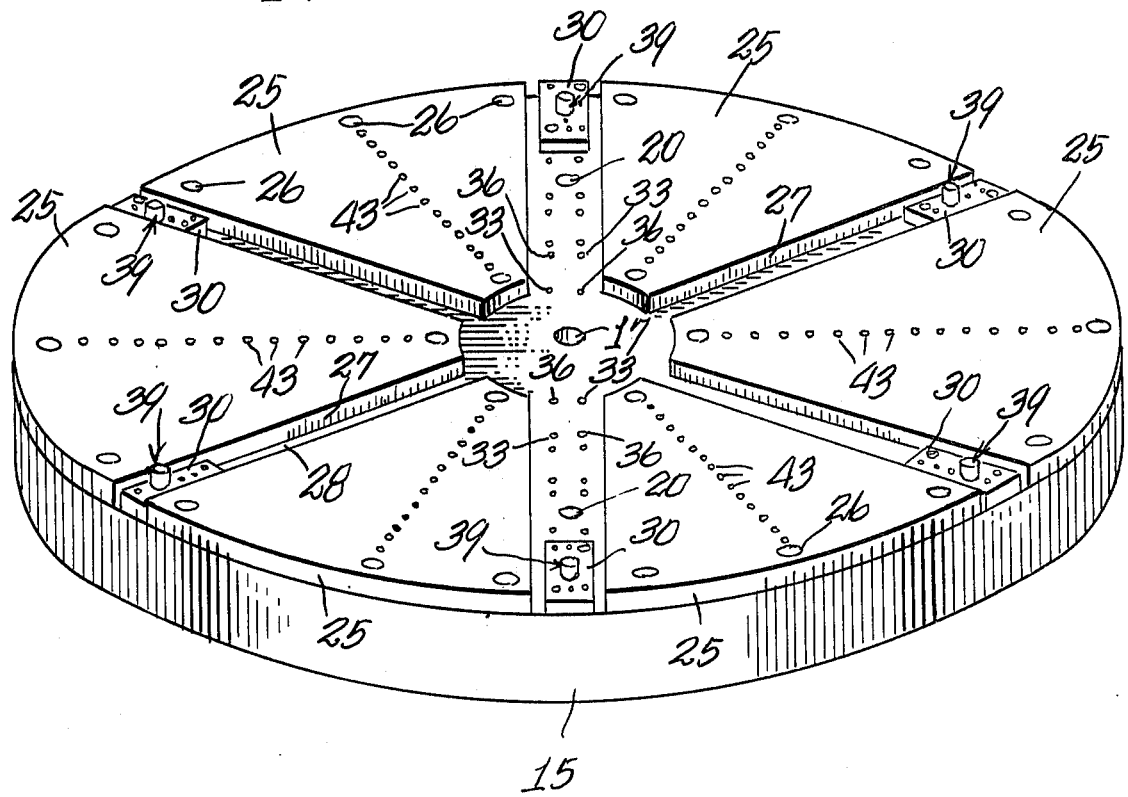

A plurality of sector-shaped support pads 25 are carried by the upper surface of the base plate. In the preferred embodiment, and as seen in FIGS. 1 and 3, six pads 25 are secured to the base plate, each held to the base plate by four countersunk, flat head socket cap screws 26. Adjoining side margins 27 of the support pads are spaced apart to leave a radiallyextending passageway 28, which, in fact, is formed by the upper surface of the support plate.

As illustrated in FIG. 1, each passageway 28 has four sets of four holes spaced radially thereof, corresponding sets of holes in each passageway being equally spaced from the center of the base plate. Further, the radial distance S of each set is equal, as is the radial distance R between the sets.

A locator block 30 is adjustably disposed radially of each passageway 28. As seen in FIGS. 7 through 10, each locator block is of metal which is rectangular in plan view and has sufficient thickness to provide a sturdy locator member. In one pair of diagonally opposite corners of the block counterbored holes 31 are provided, each to pass a socket head cap screw 32 which thread into corresponding threaded openings 33 in each set of holes in the passageway 28. Fixed within holes 34 in the other pair of diagonally opposite corners of each block are standard dowel pins 35 which are adapted to fit into plain corresponding openings 36 of any set of holes.

When it has been determined the diameter of the workpiece to be held by the fixture, each locator block 30 is adjusted equidistant from the center of the base plate to a position in correspondence with the diameter of the workpiece. The dowel pins 35 of each locator block 30 are pushed into the openings 36 in a selected one of the sets of openings, and the threaded shanks of the socket head screws 32 are entered through the openings 31 and threaded home in the threaded openings 33 of the selected set of openings.

Figure 5:
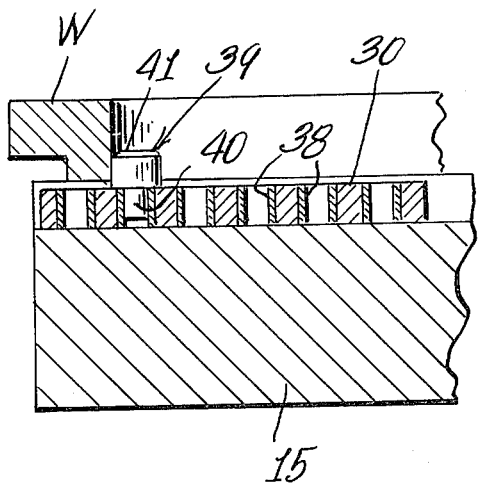

As best seen in FIGS. 7 and 9, each locator block 30 has a set of centrally-located openings 37 which extend radially when the block is secured in a selected adjusted position. A standard hardened and ground sleeve liner 38 is fixed within each opening 37. A hardened and ground locator pin 39 has a shank 40 to fit within any one of the sleeves 38. The pin has a head 41 which, as seen in FIG. 5, is adapted to abut the internal surface of the ringlike workpiece W. The locator shank 40 fits within the sleeves 38 with very close tolerance and the block 30 is therefore formed with a slot 42 so that a screwdriver blade may be inserted therein to dislodge the locator pin 39.

It will be appreciated that the locator blocks 30 are radially adjusted in their respective passageways 28 so that the locator pins 39 carried by each are arranged in a circular pattern for radially positioning the ringlike workpiece. If radial adjustment of the locator blocks within the passageways 28 does not provide the required radius for the circular pattern, a finer radial adjustment may be made by shifting the locator pins 39 to a selected sleeve 38 in the locator block. Therefore, the inside diameter of a wide variety of ring-shaped workpieces may be accomodated. If the workpiece is of a small diameter, as shown in FIG. 6, the locating pins 39 may engage the outside peripheral surface of the workpiece.

Figure 4:
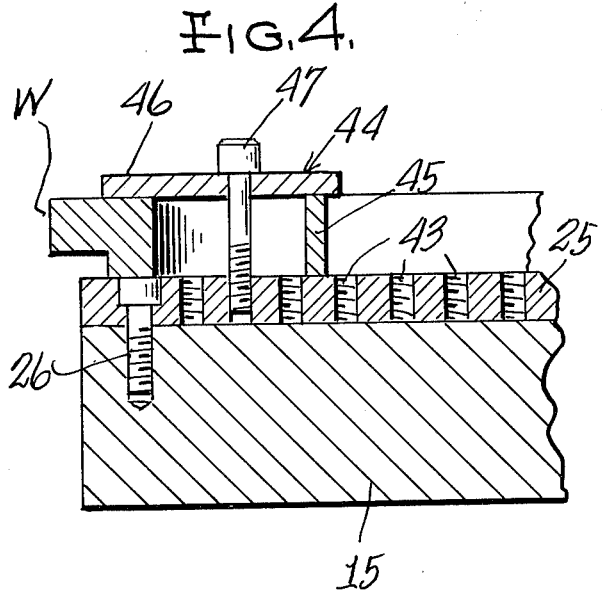

Each of the support pads 25 is provided with a series of radially-extending tapped holes 43. A clamp 44 (see especially FIG. 4) is mounted on each pad 25 for the purpose of holding the workpiece to the fixture against axial separation. Each clamp is generally L-shaped and has a toe piece 45 and a clamp arm 46 welded to the toe piece. The clamp arm has a hole therethrough to pass the shank of a socket head bolt 47. The bolt is threaded into a convenient tapped hole 43 so that the free end of the toe piece bears against the pad surface and the arm 46 overlies the workpiece and draws it firmly against the support pad.

I claim:

1. A fixture attachable to the table of a machine for holding a workpiece in operative relationship with a tool of the machine, said fixture comprising:
   a base plate and means for locating said base plate in predetermined relation on the table of said machine and for holding a surface of said base plate against the upper surface of said table,
   a plurality of supporting pads secured to an opposite surface of said base plate and upon which said workpiece is supported, each supporting pad being sector-shaped and said pads being arranged in circular fashion with adjoining margins spaced to expose therebetween passageways formed by portions of said opposite surface and said adjoining margins, said passageways extending radially from a centerpoint of the circular arrangement of said pads,
   a locator block for each passageway and adjustable therealong toward and away from said centerpoint, each locator block having an abutment extending outwardly therefrom,
   means for holding said locator blocks in a selected adjusted position wherein the abutments of the same engage spaced parts of a peripheral surface of said workpiece to locate the latter and hold it against shifting along said pads, and
   clamp means for holding said workpiece against axial separation from said base plate.

2. The construction according to claim 1 wherein said means for holding said locator blocks in adjusted position comprise a plurality of apertures in each passageway spaced apart along a radial line, and projection means on each locator block for fitting within selected of said apertures in a respective passageway.

3. The construction according to claim 2 wherein the apertures in said passageways are arranged equidistant from said centerpoint whereby said locator blocks may be adjusted so that the abutments thereon are arranged in a circular pattern to engage a circular peripheral surface of said workpiece.

4. The construction according to claim 3 wherein each locator block has a plurality of apertures arranged to extend along a radial line, and said abutments are formed by the head of a pin, the shank of the latter fitting closely within any one of the apertures in said locator block.

5. The construction according to claim 3 wherein the apertures in each passageway are arranged in sets, each set including a tapped and an untapped aperture, and each of said locator blocks has a dowel pin seatable within an untapped aperture and a hole to pass a machine screw which is threaded into a tapped aperture.

6. The construction according to claim 5 wherein each of said pads has a series of tapped holes extending in radial manner, and a clamp means for each pad, each clamp means having an arm for overlying said workpiece and a hole for passing the threaded shank of a bolt, said bolt being threaded in a selected tapped hole in a respective pad, depending upon the peripheral size of said workpiece, and adapted to draw said arm against said workpiece and thereby clamp the latter against a respective pad.

7. A fixture attachable to the table of a machine for holding a workpiece in operative relationship with a tool of the machine, said fixture comprising:
   a base plate and means for locating said base plate in predetermined relation and in nonrotatable fashion on the table of said machine and for holding a surface of said base plate against an outer surface of said table,
   a plurality of locator blocks mounted on the opposite surface of said base plate and adjustable therealong toward and away from a center point on said base plate, each of said locator blocks having an abutment extending outwardly therefrom,
   means for holding said locator blocks in a selected adjusted position wherein the abutments of the same engage spaced parts of a peripheral surface of said workpiece to locate the latter and hold it against shifting laterally along said opposite surface of said base plate, and
   said holding means including apertures in said base plate opposite surface and arranged in sets, each set including a tapped and untapped aperture, and said holding means further including a dowel pin on each locator block seatable within an untapped aperture and a hole in each locator block to pass a machine screw which threads into a tapped aperture to hold the locator block to said base plate, and
   clamp means mounted on said base plate for adjustment to various positions thereon in accordance with the size of a particular workpiece located by said abutments, said clamp means engaging said workpiece and holding it against axial separation from said base plate.

* * * * *